US006785864B1

(12) United States Patent
Te et al.

(10) Patent No.: US 6,785,864 B1
(45) Date of Patent: Aug. 31, 2004

(54) SYSTEM AND METHOD FOR NOTIFYING OF CHANGES IN WEB PAGE HYPERLINKED DOCUMENTS

(75) Inventors: George A. Te, New Hamburg, NY (US); Edward E. Kelley, Wappingers Falls, NY (US); Norman J. Dauerer, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/452,584

(22) Filed: Dec. 1, 1999

(51) Int. Cl.[7] ............................................. G06F 15/00
(52) U.S. Cl. .................... 715/501.1; 715/513; 715/500; 345/846
(58) Field of Search ............................. 715/501.1, 513, 715/500; 345/846

(56) References Cited

U.S. PATENT DOCUMENTS

| | | | | |
|---|---|---|---|---|
| 5,675,753 A | * | 10/1997 | Hansen et al. | 345/744 |
| 5,813,007 A | | 9/1998 | Nielsen | 707/10 |
| 5,860,071 A | * | 1/1999 | Ball et al. | 707/100 |
| 5,870,769 A | * | 2/1999 | Freund | 715/501.1 |
| 5,898,836 A | | 4/1999 | Freivald et al. | 395/200.48 |
| 6,088,707 A | * | 7/2000 | Bates et al. | 715/501.1 |
| 6,219,818 B1 | * | 4/2001 | Freivald et al. | 714/799 |
| 6,321,242 B1 | * | 11/2001 | Fogg et al. | 715/513 |
| 6,341,290 B1 | * | 1/2002 | Lombardo et al. | 707/104.1 |
| 6,347,320 B1 | * | 2/2002 | Christensen et al. | 707/102 |
| 6,393,437 B1 | * | 5/2002 | Zinda et al. | 707/201 |
| 6,632,142 B2 | * | 10/2003 | Keith | 463/42 |

OTHER PUBLICATIONS

Shimada et al., Automatic Link Generation and Repair Mechanism for Document Management, IEEE 1998, pp. 226–235.*
P. Loshin, "Netscape's enterprising server upgrade," BYTE, vol. 22, No. 5, p. 123, May 1997.

* cited by examiner

Primary Examiner—Stephen S. Hong
Assistant Examiner—Conglac Huynh
(74) Attorney, Agent, or Firm—James J. Cioffi

(57) ABSTRACT

A system and method for notifying a user of changes in a hyperlinked document, the system comprising a computer, a server operatively coupled with the computer, a web browser that executes in the computer, the web browser accessing web pages stored on the server, and a general notification system integrally connected with the web browser, the general notification system configured to provide a notification icon on a web page, wherein notification of any changes to the hyperlinked document can be requested by selecting the notification icon. The method comprising providing a notification icon within a web page having a hypertext link associated with the hyperlinked document, selecting the notification icon, and notifying the user of any changes to the hyperlinked document.

22 Claims, 17 Drawing Sheets

LIST ENTIRE NOTIFY TABLE BY DISK-DIRECTORY.
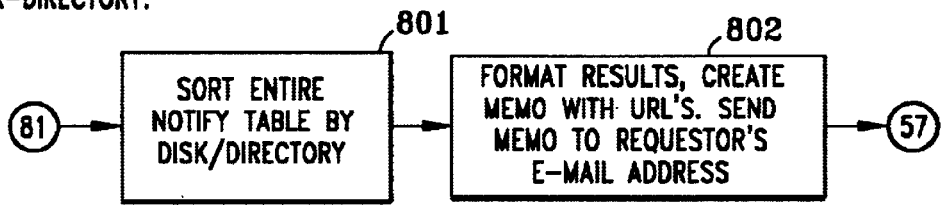
LIST ENTIRE NOTIFY TABLE BY NOTIFY-ID.
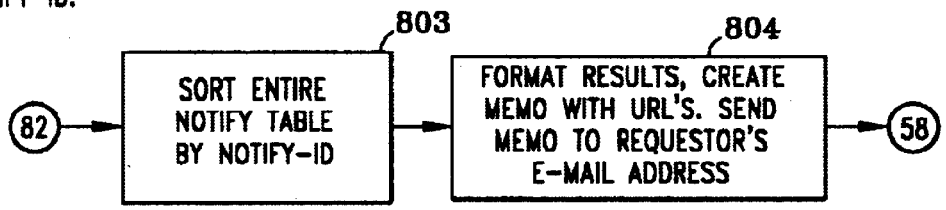
LIST ENTIRE NOTIFY TABLE BY REQUESTOR-ID.
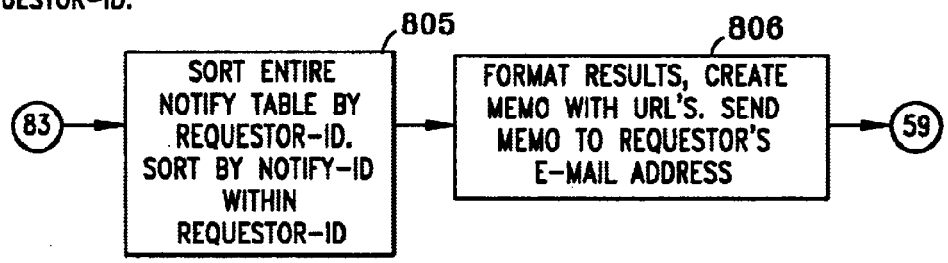
FIG. 8

| MODE | USER-ID | NOTIFY-ID | ENTRY-DATE | DIRECTORY-FILENAME |
|---|---|---|---|---|
| U | jane | norm1 | 20000305101141 | 202/asset.data.html |
| U | jane | hudson | 20000305101142 | 202/order.software.html |
| U | david | david | 20000409090530 | 675/iso9000.report.html |
| U | greg22 | george9 | 20000220072055 | 344/metalslurry.specs.html |
| U | teddy | george9 | 20000225081020 | 344/metalslurry.process.html |
| | | | | |
| | | | | |

FIG. 10

| MODE | DIRECTORY-FILENAME |
|---|---|
| U | 202/asset.data.html |
| U | 202/order.software.html |
| U | 675/iso9000.report.html |
| U | 344/metalslurry.specs.html |
| U | 344/metalslurry.process.html |
| D | 193/travel.expense.html |
| N | 488/candidtate2.file.html |
| | |

[PBU DAILY PRODUCTION PRIORITIES] — 104

File  Edit  View  Go  Bookmarks  Options  Directory  Window  Help http://lict:1016/user/iu00541.cgi NOTIFY–Check on one or more boxes below — 126
128 — ☐–ALL–Check ALL BOXES!!! [Submit Request] [Clear] ......FAST-RETURN Click here!

PBU DAILY PRODUCTION PRIORITIES
PRODUCT PRIORITY REPORTS

| NAME | DATE | TIME |
|---|---|---|
| ☑ LAYER1 9211PRI | 990330 | 17:16:42 |
| ☐ TRABUCCO 9211PRI | 990330 | 17:16:41 |
| ☐ RUSOTTO 9211PRI | 990330 | 17:16:40 |
| ☑ SICINAR 9211ORI | 990330 | 17:16:40 |
| ☐ SZELI 9211PRI | 990330 | 17:16:39 |
| ☐ BISCARDI 9211PRI | 990330 | 17:16:59 |
| ☐ PETRY 9211PRI | 990330 | 17:15:59 |
| ☑ LATELARG 9211PRI | 990310 | 14:53:41 |
| ☐ ILCWEB TESTPRI | 990224 | 14:29:29 |
| ☐ ANALYZER REFERENC | | |
| ☐ BAYON 9211PRI | 990210 | 08:26:48 |

122

118

124 — Document  Done

FIG. 16

[Request ILC Access]

File  Edit  View  Go  Bookmarks  Links  Options  Directory  Window  Help http://ilct.fishkill.ibm.com:1016/user/iu00547.cgi ilc notify Check one or more of the boxes below(Reports will be sent to your EMail address)—

☑ 01-What am I on notify for?
☐ 02-For a set of Ids, what are they on-notify for?
☐ 03-For this filename,"Who are on-notify for it?
☐ 04-For this disk-directory, who are on-notify for what file?
☐ 05-For this DEPT, who are on-notify, for what file?
☑ 06-List entire notify1.app-by date requested.
☐ 07-List entire notify1.app-by disk/filename order.
☐ 08-List entire notify1.app-by notify-id order.
☐ 09-List entire notify1.app-by requestor-id order.
☐ 10-Reminder notice to all notify-ids.

[Submit Request] [Clear]

To send a message to ilc programmer: John Doe Phone 555-5555 (doe@us.ibm.com)

Document  Done 124  159  126  165

FIG. 17

| | | | | | |
|---|---|---|---|---|---|
| | Netscape—WWW Search Engines | | | | |
| | Lotus Notes—ILCWEB_Notify_Changes | | | | |
| | File Edit View Create Actions Window Help | | | | |

To: John Doe/Fishkill/IBM
cc:
Subject: NOTIFY_RPT--from SYSTEM on Tue

File: doe.rpt
Notify-Id: doe
Date: 19990330 16:38:41

ILCWEB NOTIFICATION-REPORT 01

Requestor - What am I on-notify for?

| | | | | |
|---|---|---|---|---|
| U doe | doe19990209091122 | 197/bartoloti.a.html | U doe53 doe | 19990211151515 207/664—79.data.html |
| U doe | doe19990209091122 | 199/c00060.data.html | U doe53 doe | 19990211161616 207/664—80.data.html |
| U doe | doe19990209091122 | 202/ddcpetk.data.html | U doe doe | 19990212202020 208/biscardi.9211pri.html |
| U doe | doe19990209091122 | 202/ddcpoem.data.html | U doe doe | 19990308151715 457/inspstra.new.html |
| U doe | doe19990209091122 | 202/mxxwaf1.data.html | U doe doe | 19990308151715 457/inspstra.prn.html |
| U doe | doe19990209091122 | 202/mxxwaf11.data.html | U doe doe | 19990308151715 457/orbavil.data.html |
| U doe | doe19990209091122 | 202/rxxwaf1.data.html | U doe doe | 19990308123239 476/17kdshr2.data.html |
| U doe52 | doe19990210111230 | 207/664—29.data.html | U doe doe | 19990308123239 476/ewrlogbk.data.html |
| U doe52 | doe19990210111230 | 207/664—43.data.html | U doe doe | 19990308123239 476/grades.data.htmlll |
| U doe52 | doe19990210111230 | 207/664—75.data.html | U doe doe | 19990308123239 476/partnos.data.html |
| U doe52 | doe19990210111230 | 207/664—77.data.html | U doe doe | 19990215121401 900/kkk.data.html |
| | | | U doe doe | 19990215121402 900/lll.data.html |

SYSTEM AND METHOD FOR NOTIFYING OF CHANGES IN WEB PAGE HYPERLINKED DOCUMENTS

FIELD OF THE INVENTION

The present invention relates generally to web browser enhancements. More particularly, the present invention relates to a system and method for notifying of changes in web page hyperlinked documents.

BACKGROUND OF THE INVENTION

Many people use the Internet, or a corporate Intranet, to find a variety of information. Often, when people use the Internet, they use a section of the Internet called the World Wide Web. The World Wide Web is a massive collection of web pages that contains a variety of information. Similarly, a corporate Intranet is a more limited collection of web pages that also contains a variety of information. The web pages on the Internet and on corporate Intranets are normally accessed by the user through a web browser. Typically, the web browser displays one web page at a time. Often times, a web page will contain a hypertext link to another web page called a hyperlinked document. By selecting the hypertext link, the user can be taken to the hyperlinked document that is associated with the hypertext link.

The drawback with Internet and corporate Intranet systems is that the information presented within the web pages is often updated and changed without notification to the users. Therefore, a user who accesses information on web pages does not have an effective method of being notified when a web page or a hyperlinked document is changed. While there are current systems which notify a user of changes to a web page, these notification system are rather limited.

For example, U.S. Pat. No. 5,813,007 (the '007 patent) teaches an apparatus, method, system and computer program product which provides automatic notification of sufficient changes in bookmarked information files. The '007 patent provides a user of information access programs, such a web browsers, to automatically be informed of changes in information files, such as World Wide Web pages, when the maintainer of the information file determines that a sufficient change has been made to the file.

U.S. Pat. No. 5,898,836 (the '836 patent) teaches a change-detection web server which automatically checks web-page documents for recent changes. The server retrieves and compares documents one or more times a week. The user is notified by electronic mail when a change is detected. The user registers a web page document by submitting his e-mail address and the uniform resource locator (URL) of the desired document.

Users would benefit from a notification system that provided the ability to easily select a hypertext link from a web page and then be electronically notified whenever the hyperlinked document that is associated with the hypertext link changes.

SUMMARY OF THE INVENTION

In view of the above limitations of existing web browsers, it is an aspect of the present invention to provide a computer system comprising a computer, a server operatively coupled with the computer, a web browser that executes in the computer, the web browser accessing web pages stored on the server, and a general notification system integrally connected with the web browser, the general notification system configured to provide a notification icon on a web page, wherein notification of any changes to the hyperlinked document can be requested by selecting the notification icon. In one preferred embodiment, the general notification system further comprises a subscription program which is invoked upon selecting a notification icon, the web page further comprises a hypertext link associated with the hyperlinked document, the subscription program changes the web page to a notification page, and the notification page further comprises a checkbox next to the hypertext link. In one preferred embodiment, the general notification system further comprising a canvasser program configured to find the hyperlinked document and compare a found hyperlinked document to a current hyperlinked document for changes to the hyperlinked document. In one preferred embodiment, the general notification system further comprises a notify program for comparing data fields in the notify table with data fields in the change table and notifying the user of any changes to the hyperlinked document. In one preferred embodiment, the general notification system further comprises a notify reports program configured to generate a report for the user.

Another aspect of the present invention is to provide a method of notifying a user of changes in a hyperlinked document, the method comprising providing a notification icon within a web page having a hypertext link associated with the hyperlinked document, selecting the notification icon, and notifying the user of any changes to the hyperlinked document. In one preferred embodiment, the method further comprises generating a notification page upon selecting the notification icon, the notification page having a checkbox next to the hypertext link, and marking the checkbox. In one preferred embodiment, the method further comprises periodically canvassing the Internet for the hyperlinked document, and comparing a found hyperlinked document a current hyperlinked document for changes.

As will be appreciated by those of skill in this art, the above described aspects of the present invention may also be provided as apparatus or computer program products and is particularly well suited to program tools, applications, web browsers, or operating systems which utilize hypertext links.

BRIEF DESCRIPTION OF THE DRAWINGS

FIG. 8 is a flow chart illustration of report programs G, H, and I for a notify reports program, according to one preferred embodiment of this invention;

FIG. 10 is an example of a notify table, according to one preferred embodiment of this invention;

FIG. 11 is an example of a change table, according to one preferred embodiment of this invention;

FIG. 14 is an illustration of a notifications page, according to one preferred embodiment of this invention;

FIG. 16 is an illustration of a notification report menu, according to one preferred embodiment of this invention;

FIG. 17 is an illustration of the results of report program A, according to one preferred embodiment of this invention.

DEFINITIONS

Figure 1:
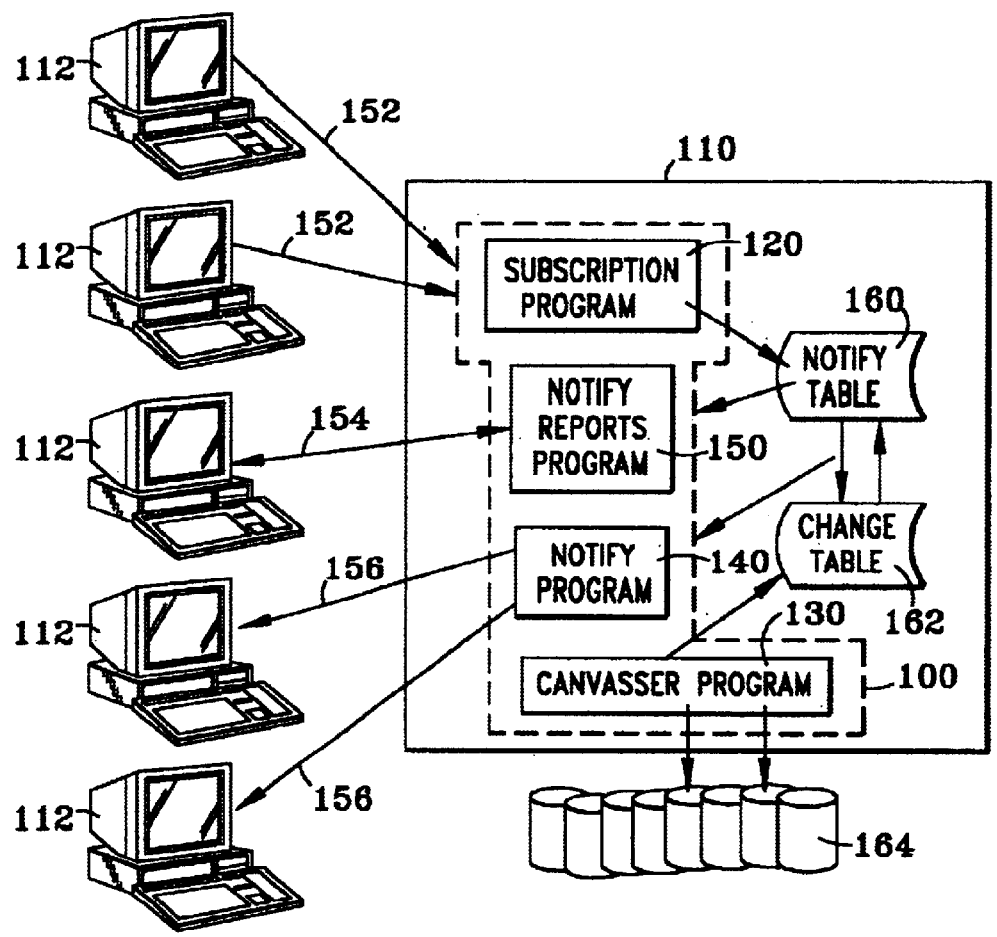
FIG. 1 is a block diagram of a general notification system, according to one preferred embodiment of the invention.

As used herein, the term "A HREF" refers to an HTML notation indicating a hyperlinked document. On the web page itself, a word or name associated with the "A HREF" appears highlighted and/or underscored. When a user clicks and selects on the word or name, the web browser follows the path indicated by the "A HREF" to the source system to obtain the document and presents it back to the user.

As used herein, the term "CGI" refers to Common Gateway Interface which is the protocol in which a user using a web browser may interact with a Server, by submitting a request or data input. The Server receiving the CGI input will invoke the associated CGI program to process the input. The CGI program usually sends a response back to the user to signal the completion of the transaction.

As used herein, the term "CRONTAB" refers to a Unix feature which lines up programs for batch runs as triggered by the system clock. Programs that are designed to be triggered on a particular day, date, and time are so designated in the Unix's CRONTAB. In this manner, programs can be invoked automatically in a Unix environment.

As used herein, the term "directory-filename" refers to the Unix notation of "path" as marked by forward slash "/", ending with a filename in that path. As used herein the term "directory" also refers to the "path," that is, the place where a file resides. Filename uses Unix "dot" notation convention. For example, for the directory-filename "www.bostonpie.com/corp/personnel/salary.txt," "www.bostonpie.com/corp/personnel/" is the path to the specific filename "salary.txt". This is saying that the file, "salary.txt", is found in this specific path.

As used herein, the term "disk-directory" refers to the "path" portion of a "Directory-Filename" designation. For example, for the path ending with /433/pension.plan, "pension.plan" is the specific file and "/433/" is the disk-directory where the file "pension.plan" resides in. "/433/" is part of the path to the "pension.plan" file.

As used herein, the term "display screen" refers to a plurality of picture elements which collectively define the appearance of a user interface environment, such as a web browser. The contents of the display screen, and therefore, the appearance of the user interface environment, may be controlled or altered by an application or an operating system either individually or in combination.

As used herein, the term "e-mail" or "electronic mail" refers to a delivery system for electronic documents or messages over the Internet. A user of computer system, including the Internet, usually owns an e-mail address where he/she receives electronic documents or messages.

As used herein, the term "e-mail address" refers to the unique address that a user of an electronic mail system owns. An Internet e-mail address typically has the form "john33@businessA.com", wherein "john33" is a specific user at the e-mail service station "businessA.com" and where "BusinessA.com" is unique on the Internet.

As used herein, the term "entry-date" refers to the date and time that a notification subscription was entered by the user.

As used herein, the term "home page" refers to the first page in an Internet web system. When a user enters the URL of an Internet web application system, the first page that is sent by the web server back to the user is usually the home page. The home page identifies the application and links and hyperlinks to other subsequent web pages.

As used herein, the term "HTML" refers to Hypertext Markup Language, which is a markup language with agreed upon notations. A document with HTML notation can traverse the Internet and presents itself on any computer with any variety of web browsers. The HTML notation deals with font, color, size, placement of elements within a document, as well as hypertext links to hyperlinked documents from the current, as well as other, source systems.

As used herein, the term "hyperlinked document" refers to a document which is associated with a hypertext link located on a web page or in another document. Within the web page, the HTML notation "A HREF" designates that what follows is a hyperlinked document. When a user clicks on and selects the hypertext link associated with a hyperlinked document, the web browser follows the path indicated in the "A HREF" to obtain the hyperlinked document from the source system, bringing it back to present to the user. It is through the power of hypertext links that a home page on an Internet web browser can expand its reach by linking up a multitude of other source systems and bringing the vast resources of information back to a user's desktop.

As used herein, the term "hypertext link" refers to a name, word, symbol, picture, illustration, or object on a web page or document, that is associated with a hyperlinked document. When the hypertext link associated with a hyperlinked document is selected, a web browser follows the path indicated in the "A HREF" to obtain the hyperlinked document from the source system, bringing it back to present to the user.

As used herein, the term "Internet" refers to the interconnected network of source systems and networks spanning the world.

As used herein, the term "Internet web system" refers to a specific segment of the Internet that pertains to a particular topic or application. An Internet web system begins with a home page and ends with leaf pages. From the home page, a user can select hypertext links, calling-in other web pages until the leaf pages are reached. For instance, "www.npr.org", is a specific Internet web system for "National Public Radio" whose home page leads to other web pages addressing topics related to "National Public Radio". After selecting enough hypertext links one will often lead to a web pages called a leaf page which doesn't have any hypertext links to other web pages.

As used herein, the term "leaf page" refers to a terminal page that an Internet web system leads to which doesn't include a hypertext link to another web page. Sometimes, leaf pages have hypertext links back to the home page.

As used herein, the term "navigation" refers to traversing an Internet web system from the home page down to leaf pages, crossing all intermediate sub-menus and web pages. As used herein, the term "on-notify" refers to a user being on notification for a particular hyperlinked document designated via subscription for notification. The designation is recorded in the notify table.

As used herein, the term "server" refers to a computer on the Internet which perform services. The most common service for a server is web serving. Other common services for a web server are name resolution and routing.

As used herein, the term "source system" refers to a target or destination location of a hyperlinked document. For example, for the URL "http://www.bostonpie.com/corp/personnel/salary.txt", "salary.txt" is the target document residing in "http://www.bostonpie.com/corp/personnel/" which is the path. Specifically "www.bolstonpie.com" is the source system, where-as, "/corp/personnel/" is a subsidiary path within the source system leading to target document.

As used herein, the term "sub-menu" refers to secondary menus pointed-to from the web menu. A sub-menu may point to other sub-menus or to leaf pages.

As used herein, the term "submit button" refers to a button in a CGI modulated web page. In a CGI modulated web page, where user's input is anticipated, a submit button always accompanies the web page. Preferably, the submit button displays the word "SUBMIT" on it. The user's input is not sent to the server until the submit button is selected.

As used herein, the term "URL" refers to Universal Resource Locator (URL) which is the name of a web site location. URL uses a protocol, understood by all elements in the Internet, such as browser, routers, name servers, and web servers, telling the Internet how and where to forward a request for service. The most common URLs follow this format: "http://www.bostonpie.com/corp/personnel/salary.txt", where "http://" is the "Hypertext Transfer.Protocol", a particular Internet transfer protocol; "www.bostonpie.com" is the source system; "/corp/personnel/" is a path within the source system; and "salary.txt" is the target file.

As used herein, the term "web browser" refers to an application on a desktop that accesses the Internet. A common web browser is the Netscape Navigator™ web browser or the Microsoft Internet Explorer™ web browser.

As used herein, the term "web menu" refers to a web page that is formatted as a menu, whereupon each selection in the menu is a hyperlink to a web sub-menu or a data file.

As used herein, the term "web server" refers to a server whose job is to serve web pages back to the users. The Internet is populated with web server nodes responding to users' requests. Besides serving web pages, a web server also execute CGI programs to interact with the users.

As used herein, the term "web site" refers to the home location for an Internet web system. When the web site is invoked, the web site usually returns a home page to a requesting user. The home page identifies the web site, and may or may not interrogate the user before allowing further access to the Internet web system.

DETAILED DESCRIPTION OF THE PRESENTLY PREFERRED EMBODIMENTS

The presently preferred embodiments will now be described more fully hereinafter with reference to the accompanying drawings, in which the presently preferred embodiments are shown. This invention may be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable storage medium may be utilized including read-only memory (ROM), RAM, DRAM, SDRAM, hard disks, CD-ROMs, DVD-ROMs, any optical storage device, and any magnetic storage device.

FIG. 1 illustrates the overall architecture of general notification system 100 for web page hyperlinked documents 116. General notification system 100 may be embodied as one program, as a method, or as a data processing system. Accordingly, general notification system 100 may take the form of an entirely hardware embodiment, an entirely software embodiment or an embodiment combining software and hardware aspects. In one preferred embodiment, general notification system 100 comprises subscription program 120, canvasser program 130, notify program 140, and notify reports program 150. Subscription program 120 allows the user to mark hyperlinked documents 116 for notification. Canvasser program 130 canvasses all hyperlinked documents 116 and keeps track of hyperlinked documents 116 that have changed. Notify program 140 compares subscription list 142 and the canvassed results from canvasser program 130 and notifies subscribers if their marked hyperlinked document 116 had changed. Notify reports program 150 allows users to find out from general notification system 100 what hyperlinked documents 116 they are subscribed to along with other information. In one preferred embodiment, general notification system 100 is located on and is executed from server 110. In one preferred embodiment, server 110 is a web server that serves web pages back to the users. In addition to general notification system 100, server 110 comprises notify table 160 and change table 162, both will be described in detail later.

Users can access general notification system 100 through computer 112. Computer 112 is any device that can process, send and receive digital signals known to one of ordinary skill in the art, such as a microcomputer, a personal digital assistant (PDA), a cellular phone, a wireless pager, or any other device which utilizes a computer processor. Users may use a web browser to access a web site with general notification system 100 in place.

Server 110 communicates with databases 164. Databases 164 are resources that server 110 links to in order to serve up the web pages requested by a web browser. Additionally, information regarding menus and data files resides in databases 164.

Figure 13:
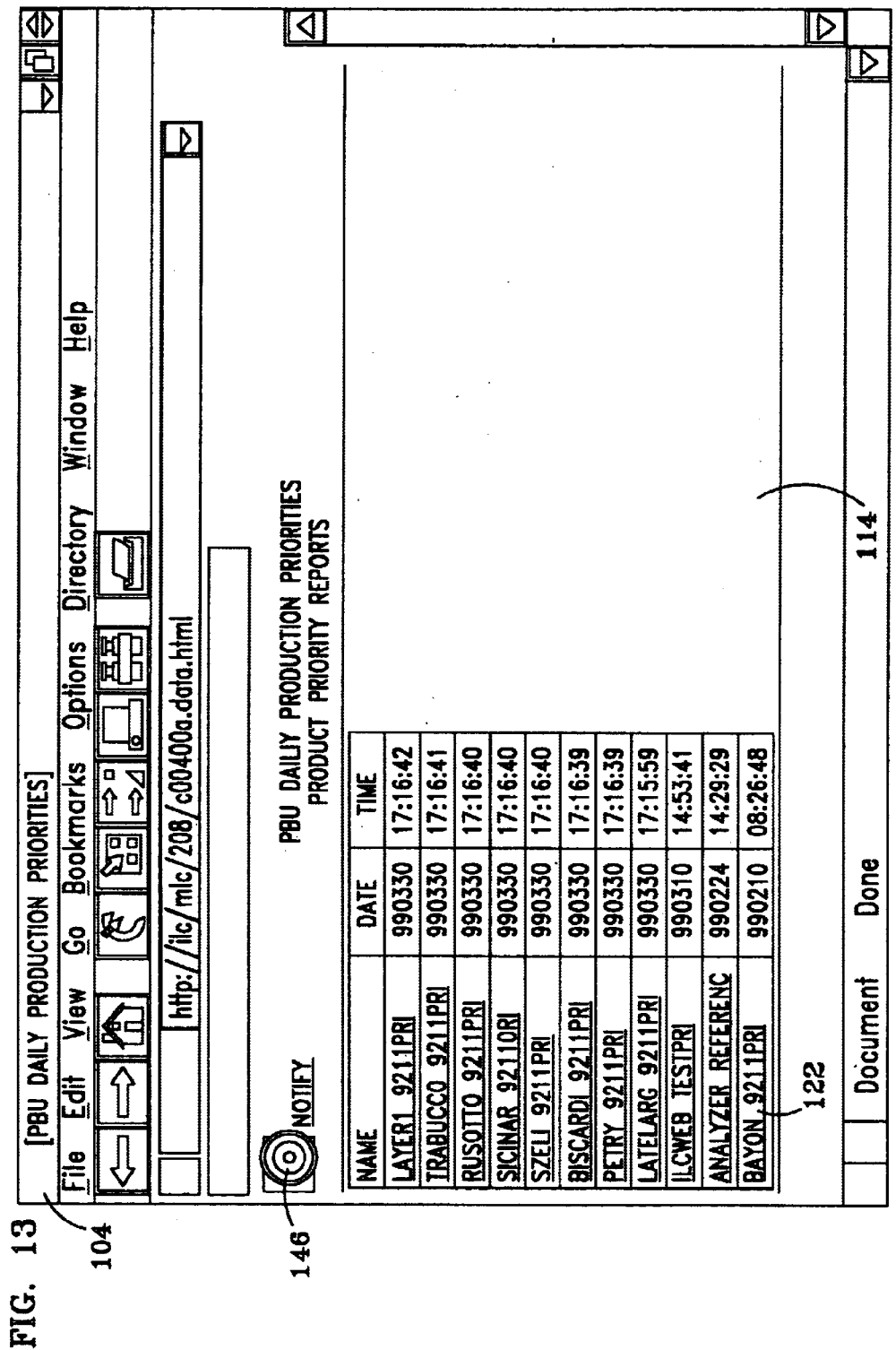
FIG. 13 is an illustration of a web page having a notification icon, according to one preferred embodiment of this invention.

A user using a web browser requests notification of any changes to hyperlinked document 116 by selecting notification icon 146 which is preferably placed in the upper left corner on every web page 114, as illustrated in FIG. 13. When a user selects notification icon 146, subscription program 120 is invoked at server 110. Subscription program 120 gets a copy of the current web page 114, that is current to a specific user, and converts and returns web page 14, now called a notification page 118, to the user with checkboxes 124 next to each hypertext link 122, as illustrated in FIG. 14. The user may select hypertext link 122 associated with hyperlinked document 116 that the user wants to be "on-notify" for, by selecting checkbox 124 next to that hypertext link 122. The user may submit the marked notification page 118 back to server 110 by selecting submit button 126.

Subscription program 120 is a CGI program that resides in and is executed from server 110. In one preferred embodiment, subscription program 120 performs a few preliminary prompts such as authenticating the user-id of the user making the request for notification, asking whether the notification is for the user or for other users, if the notification is for other users, then the user is prompted to list the notify-ids for the other users. As used herein, the notify-id is the id for any user who is to receive notification, while the user-id is the id of the user who is requesting notification. Finally, subscription program 120 prompts the user if the user is invoking subscription program 120 for notification or for unnotification. As used herein, the term "unnotification" refers to undoing a previous subscription to a certain hyperlinked document 116, while the term "notification" refers to invoking a subscription to a certain hyperlinked document 116 and therefore receiving notification of any changes to that hyperlinked document 116. Upon performing a few preliminary prompts or upon request from the user, subscription program 110 then converts the current web page 114 that the user is looking at into notification web page 118, or an unnotification page if user had indicated that the request is for unnotification, as illustrated in FIGS. 13–14. Notification page 118 and unnotification page contain essentially the same information as web page 114, except that hypertext link 122 on notification page 118 and unnotification page now comprises checkbox 124 next to hypertext link 122. Checkbox 124 can be any icon, symbol, or alphanumeric character that can be selected by the user. In one preferred embodiment, checkbox 124 is a box, which upon selection by a user, comprises a checkmark indicated that the checkbox 124 has been selected. In one preferred embodiment, at the beginning of notification page 118 and unnotification page, check-all checkbox 128 is added. Check-all checkbox 128 allows the user to indicate that the user would like to have all checkboxes 124 on notification page 118 or unnotification page selected.

Upon generating notification page 118 or unnotification page, subscription program 120 sends notification page 118 or unnotification page to the user for viewing. Subscription program 120 then waits for the user's response. The user responds to subscription program 120 by selecting checkboxes 124 or check-all checkbox 128, and then selecting submit button 126. By selecting checkbox 124, the user indicates that he requests to be put on notification, or unnotification depending on the type of page, for any changes to the hyperlinked document 116 associated with the hypertext link 122 that is next to checkbox 124. If the user clicks on check-all checkbox 128, the user indicates that he requests to be put on notification, or unnotification depending on the type of page, for any changes to every hyperlinked document 116 associated with every hypertext link 122 on web page 114.

Upon receiving the user's request, subscription program 120 reads the user's input, that is the checks in checkboxes 124 or check-all checkbox 128, and stores the corresponding directory-filename for the selected hyperlinked document 116 into notify table 160. In one preferred embodiment, subscription program 120 also stores the user-id of the user requesting notification, the notify-id or notify-ids of the users to be notified, the date of the request, and the time of the request into notify table 160. Preferably, subscription program 120 stores all this information as a single record in Notify Table 160, and then returns to the user with a message indicating that the user's request has been processed. In the case of unnotification, subscription program 120 matches the user's input with existing records in notify table 120, and removes the matched records from notify table 120.

Notify table 160 records all the requests for notification from the users. Preferably, each record in notify table 160 corresponds to one notify-id and one hyperlinked document 116. A notification request generates one or more notification records, since a single notification request can be for several notify-ids creating several files. In one preferred embodiment, a record in notify table 160 consists of the following data fields, mode field 20, user-id field 22, notify-id field 24, entry-date field 26, and directory-filename field 28. A new record is added to notify table 160 when a user request to be placed on notification for a hyperlinked document 116. An existing record is deleted, when a user requests unnotification for a particular hyperlinked document 116. Preferably, notify table 160 is compared to change table 162 for matches at least once per day, however notify table 160 may be compared to change table 162 at any increment of time. Each matched result is a notification event of a hyperlinked document 116 to a user who has been placed on notification.

Canvasser program 130 runs periodically, and can be set to run as often as the system administrator would like, by using a program setting such as CRONTAB, for example. In one preferred embodiment, canvasser program 130 runs at least once a day. Canvasser program 130 traces' each menu and submenu of an Internet web system down to each hyperlinked document 116 in the Internet web system. Canvasser program then compares the found hyperlinked document 116 to the current hyperlinked document 116 for changes. As used herein, the term "current hyperlinked document 116" refers to the most current data on file for a requested hyperlinked document 116 and the term "found hyperlinked document 116" refers to a hyperlinked document 116 that has just been found by canvasser program 130. Canvasser program 130 can compare found hyperlinked document 116 to current hyperlinked document 116 for changes in one of many ways known to those of ordinary skill in the art. In one preferred embodiment, canvasser program 130 extracts the date/time stamp of found hyperlinked document 116 and compares the extracted date/time stamp to the previous date/time stamp for current hyperlinked document 116, as kept in a date/time stamp file on server 110, for changes. In one preferred embodiment, if the date/time stamp has changed, the directory-filename is recorded in change table 162 as a "U" in mode field 20 indicating that the requested hyperlinked document 116 has been updated and probably changed. A hyperlinked document 116 can be designated as new in mode field 20, in the notify table 160 if the hyperlinked document 116 does not have a previous date/time stamp. A hyperlinked document 116 can also be designated as having been deleted in mode field 20, if the hyperlinked document 116 exist with a previous date/time stamp, and no new date/time stamp can be extracted, because the hyperlinked document 116 no longer exists. In one preferred embodiment, canvasser program 130 creates a checksum for current hyperlinked document 116 that the user requests to be on notification of. Canvasser program 130 then creates a checksum for found hyperlinked document 116, and then compares the checksum for the current hyperlinked document 116 to the checksum for the found hyperlinked document 116 for changes. In one preferred embodiment, canvasser program compares the full text or a selected portion of text from the current hyperlinked document 116 to the full text or a selected portion of text from the found hyperlinked document 116 for changes. Canvasser program 130 populates a new change table 162 every time canvasser program 130 is run.

Change table 162 records all the changes located by canvasser program 130. In one preferred embodiment, change table 162 records all the date/time stamp changes located by canvasser program 130. Each record in change table 162 indicates a hyperlinked document 116 that has been changed, newly added, or no longer exists and has been deleted. Preferably, each record in change table 162 consists of two fields, mode field 20 and directory-filename field 28. When a directory-filename field 28 in notify table 160 matches a directory-filename field 28 in change table 162 general notification system 100 may flag the user, through notify program 140, that a certain hyperlinked document 116 which that user requested notification for has changed.

Figure 15:
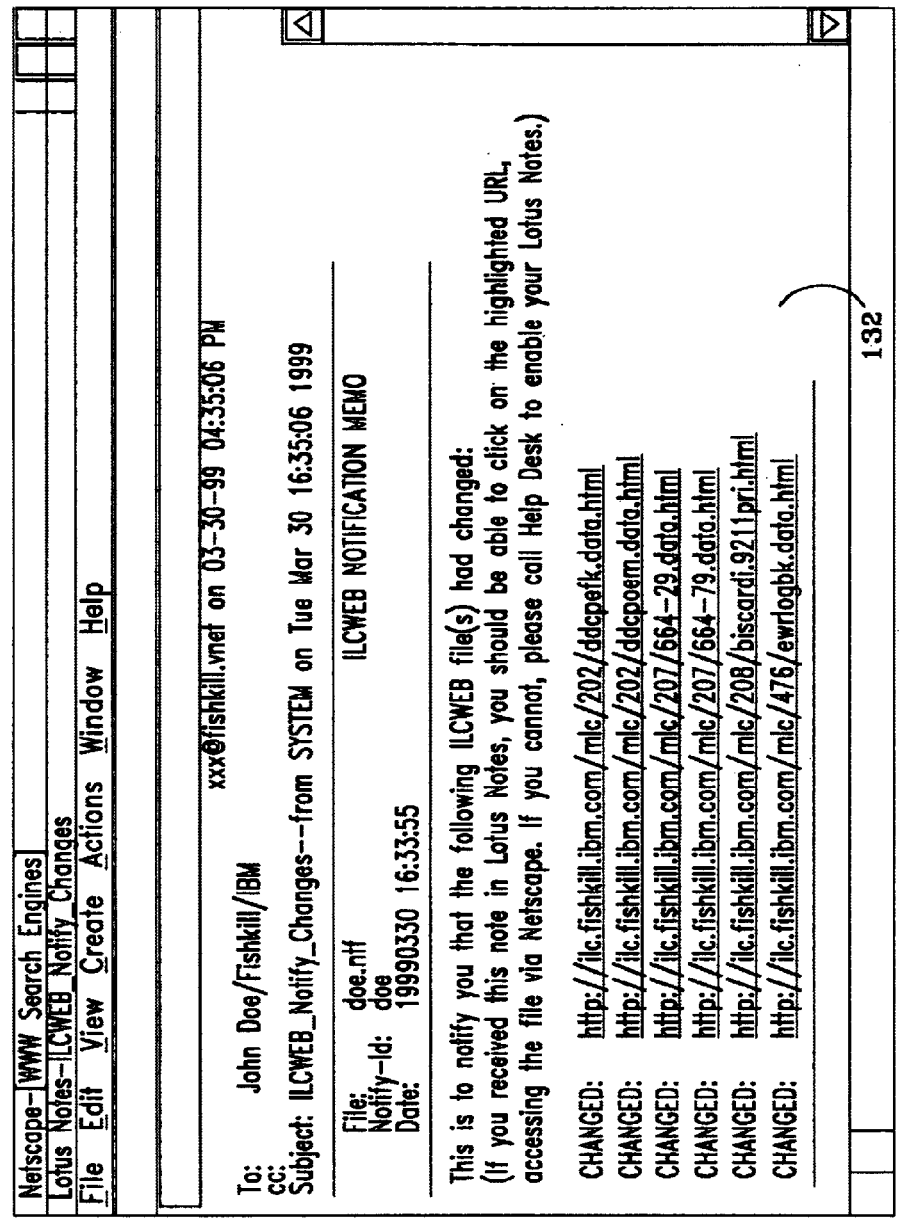
FIG. 15 is an illustration of an e-mail notice, according to one preferred embodiment of this invention.

Notify program 140, which typically runs after canvasser program 130 has completed running, compares data fields in notify table 160 with data fields in change table 162 to sort out all the matching directory-filename fields 28, and produces resulting data. Notify program 140 then sorts the resulting data by notify-id. Notify memo 156 is then created for each notify-id. Preferably, the notify memo 156 lists all the directory-filename fields 28 that were flagged by notify program 140 and listing the hyperlinked documents 116, which the user has subscribed to, indicating that the hyperlinked documents 116 have changed. In one preferred embodiment, hyperlinked documents 116 are listed as a hypertext link 122 of the hyperlinked document 116, permitting the recipient of the notify memo to invoke a web browser directly to view each hyperlinked document 116. Notify memo 156 sent by notify program 140 is received by a user having a particular notify-id, preferably as an e-mail notice 132, as illustrated in FIG. 15.

Figure 18:
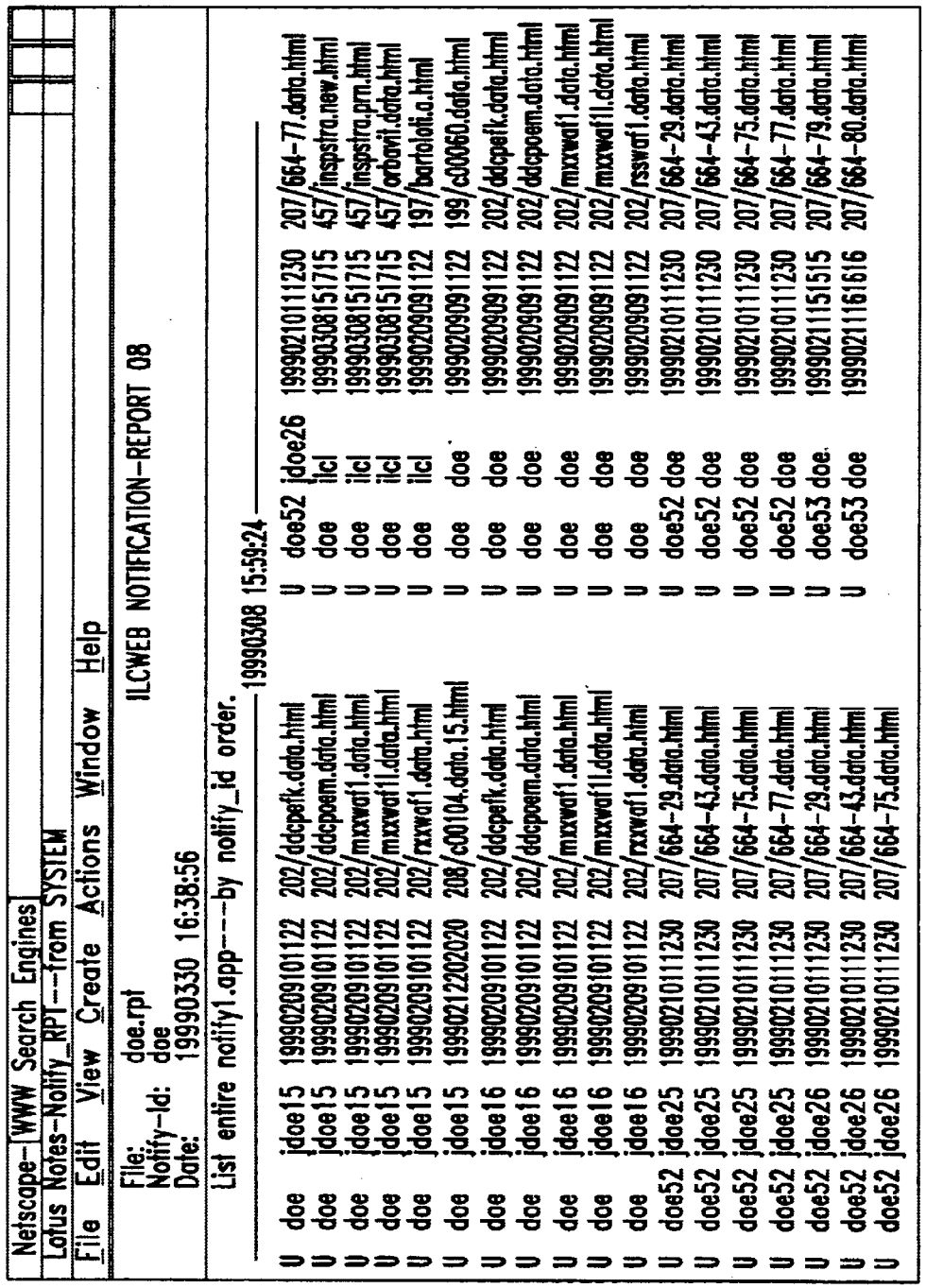
FIG. 18 is an illustration of the results of report program H, according to one preferred embodiment of this invention.

In one preferred embodiment of the invention, general notification system 100 comprises notify reports program 150 configured to generate a report for the user. In one preferred embodiment, the user of general notification system 100 can click on notify report icon 158, an icon preferably located at the bottom of the home page, to invoke notify reports program 150 and request reports from notify table 160. For instance, the user can request for a report to see what hyperlinked documents 116 the user is on notification for. In one preferred embodiment, there are up to ten reports that a user can request and the reports are present in a notification report menu 165, as illustrated in FIG. 16. Notify report program 150 preferably is executed as a CGI program that when invoked, retrieves data from notify table 160, sorts and selects the data within notify table 160, and generates a report. In one preferred embodiment, notify report program 150 then sends the report to the requesting user via e-mail notice 132, as illustrated in FIGS. 17–18.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention.

FIGS. 2–9 are flowchart illustrations of methods, apparatus, systems and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a storage medium that can direct a computer or other programmable data processing apparatus to function in a particular manner, such that the instructions stored in the storage medium produce an article of manufacture including instruction means which implement the function specified in the flowchart block or blocks. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 2:
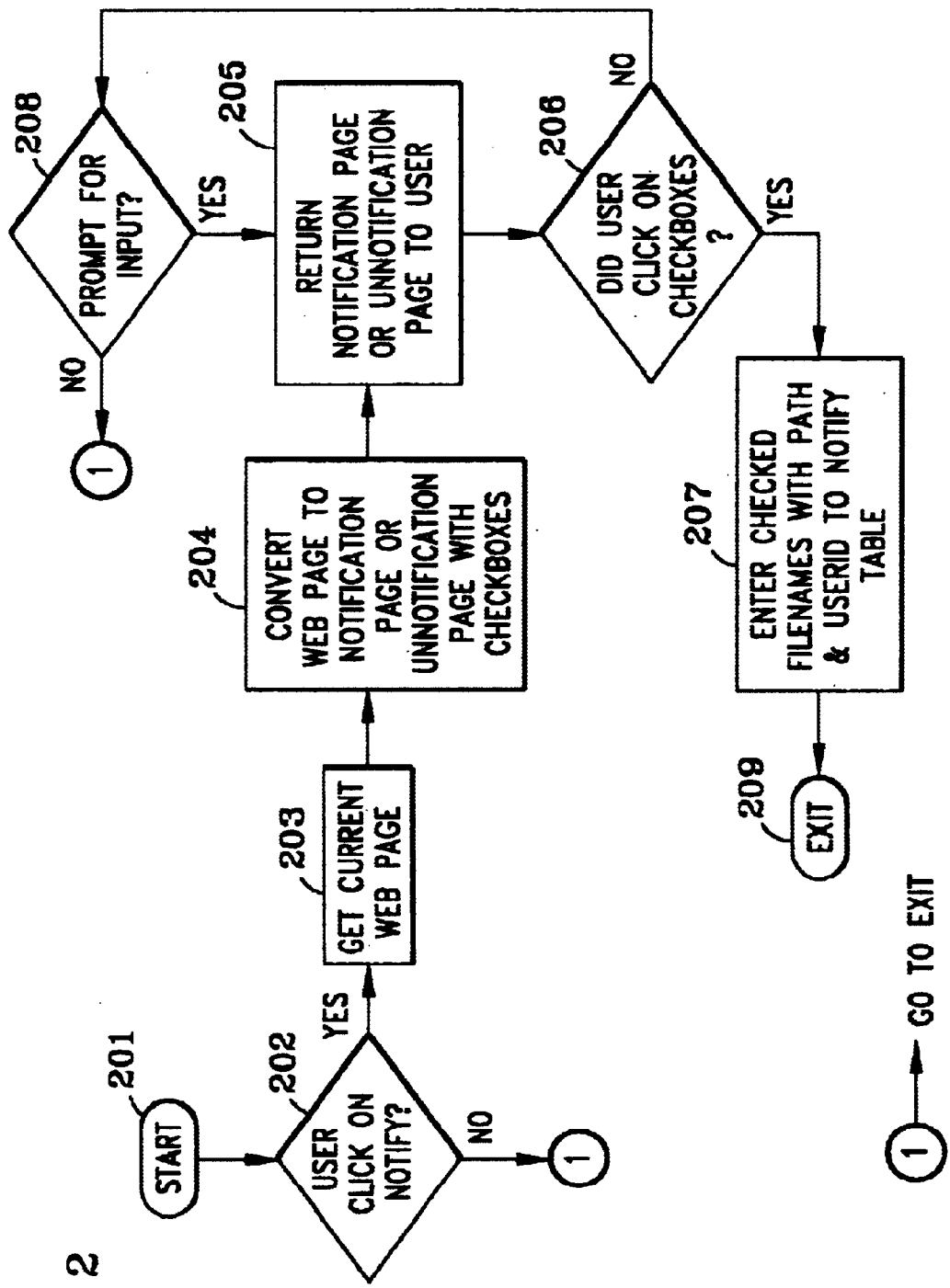
FIG. 2 is a flow chart illustration of a subscription program, according to one preferred embodiment of this invention.

FIG. 2 is a flow chart illustration of subscription program 120, according to one preferred embodiment of this invention. As seen in FIG. 2, subscription program 120 is initiated in block 201. Preferably, subscription program 120 is a CGI program. Subscription program 120 is invoked by the user when the user clicks on notification icon 146, preferably at the top left corner of each web page, as illustrated in block 202. In one preferred embodiment, subscription program 120 then checks whether the user has clicked on notification icon 146. If the user has not clicked on notification icon 146, subscription program 120 exits or terminates. In one preferred embodiment, if the user has clicked on notification icon 146, subscription program 120 then prompts for whether the user would like a notification page 118 or an unnotification page, and then subscription program may also prompt for whether this notification page 118 or this unnotification page is for the user or for other users. If this notification page 118 or this unnotification page is for other users, subscription program 120 next prompts the user to enter notify-ids for each user, of which the user can enter one or more.

After the user clicks on notification icon 146, subscription program 120 gets a copy of the current web page 114 that the user is viewing, converts the web page 114 to notification page 118 or unnotification page, and returns notification page 118 or unnotification page to the user, as illustrated in blocks 203–205. The conversion of web page 114 to notification page 118 or unnotification page, as illustrated in block 204, consists of locating all the hypertext links 122 in web page 114 and adding one checkbox 124 next to each hypertext link 122. In one preferred embodiment, the conversion of web page 114 also consists of adding a check-all checkbox 128 at the top of web page 114. In one preferred embodiment, notification page 118 or unnotification page have submit button 126. Upon returning notification page 118 or unnotification page to the user, as illustrated in block 205, subscription program 120 waits for the user to click on checkboxes 124, or check-all checkbox 128, and submit the request, as illustrated in block 206. Upon selecting submit button 126, subscription program checks for marked checkboxes 124 or marked check-all checkbox 128 from the returned notification page 118 or unnotification page. If there are no marked checkboxes 124 or marked check-all checkbox 128, subscription program 120 prompts the users for input, as illustrated in block 208. If the user refuses to mark a checkbox 124 or mark a check-all checkbox 128, subscription programs 120 exits or terminates. If marked checkboxes 124 or marked check-all checkbox 128 exist, subscription program proceeds to block 207. In block 207, subscription program 120 collects all the marked checkboxes 124 and their corresponding directory-filenames. If check-all checkbox 128 is marked, then all hypertext links 122 on web page 114 are marked as checked, and all the corresponding directory-filenames are collected. Preferably, the directory-filenames, the user-id, the notify-id(s), and the entry-date are all entered into notify table 160. If the user requested an unnotification page, the matching notify-ids and directory-filenames are removed from notify table 160, and subscription program moves to block 209. Block 209 indicates that subscription program 120 has completed processing and all entries are added or removed from notify table 160. In one preferred embodiment, subscription program 120 sends a message to the user confirming that the notification request processing is successful. Subscription program 120 then exits.

Figure 3:
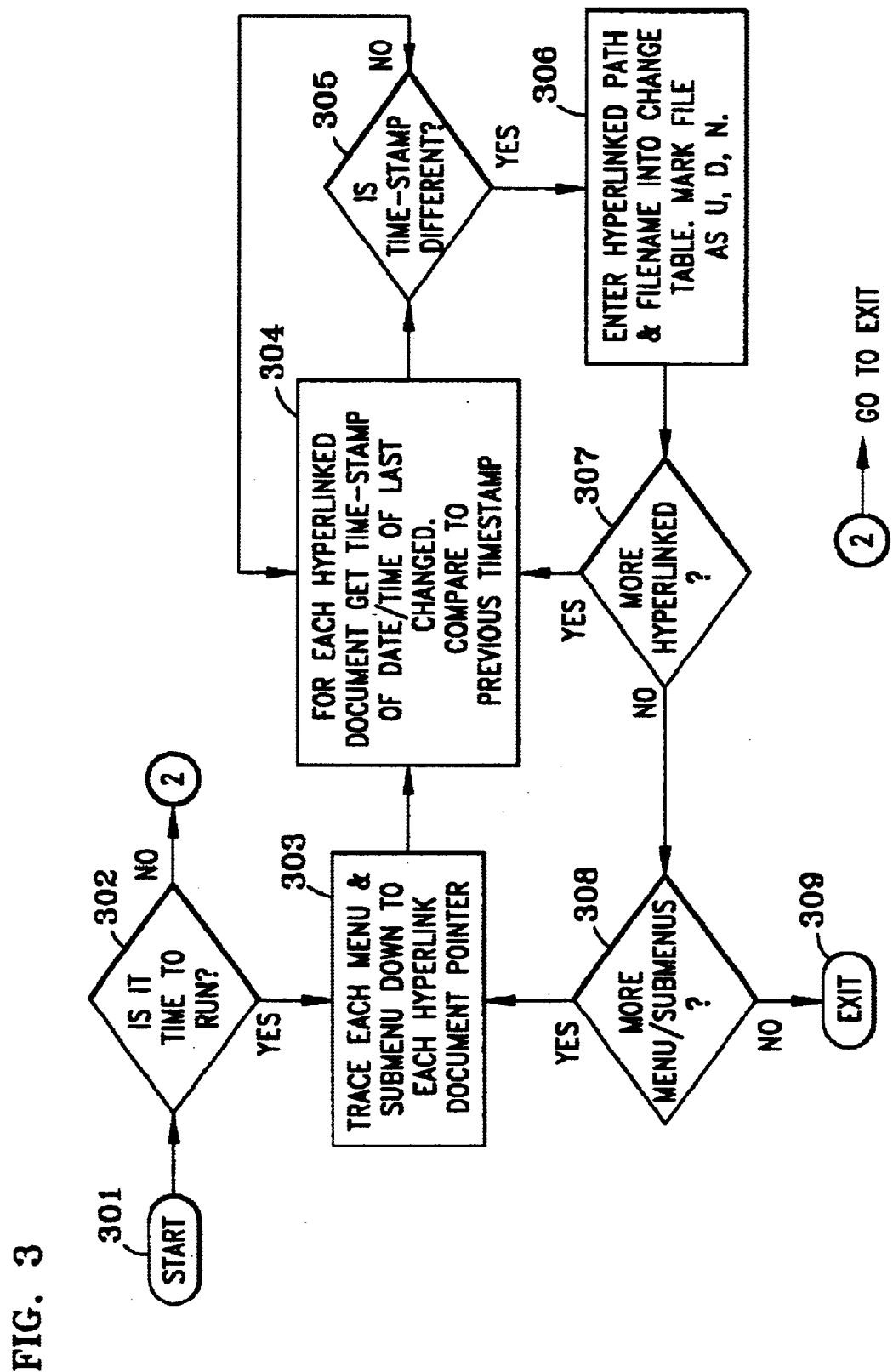
FIG. 3 is a flow chart illustration of a canvasser program, according to one preferred embodiment of this invention.

FIG. 3 is a flow chart illustration of canvasser program 130, according to one preferred embodiment of this invention. As seen in FIG. 3, canvasser program 130 is initiated in block 301. In one preferred embodiment, canvasser program 130 is triggered by the system clock, and is set up to run at a specific time of the day. In one preferred embodiment, canvasser program 130 is set up to run in the CRONTAB at a specific time of the day. Canvasser program can be set up to run more than once a day, or on some periodic basis, such as once a week on Sunday, for example. Preferably, canvasser program 130 runs once a day. Canvasser program 130 gets triggered to run in block 302 at a specific time of the day. In one preferred embodiment, if the time of the day matches the preset time in the CRONTAB, then canvasser program 130 proceeds to block 303, if not, canvasser program 130 exits or terminates.

Canvasser program 130 navigates the web menu, from the home page down through all the submenus to each leaf pages, as illustrated in block 303. At each page, menus, or leaf page, the program identifies all the found hyperlinked documents 116. Next canvasser program 130 locates and records the current date/time stamp of each of the found hyperlinked documents 116, as illustrated in block 304. Canvasser program 130 then checks whether the date/time stamp of the current hyperlinked document 116 stored in notify table 160 is different from the date/time stamp of the found hyperlinked document 116, as illustrated in block 305. If the date/time stamp of the current hyperlinked document 116 stored in notify table 160 is not different from the date/time stamp of the found hyperlinked document 116 then canvasser program 130 goes to block 304 whereupon canvasser program 130 compares the next found hyperlinked document 116. If the date/time stamp of the current hyperlinked document 116 stored in notify table 160 is different from the date/time stamp of the found hyperlinked document 116, then canvasser program 130 proceeds to block 306.

In block 306, canvasser program 130 proceeds to verify that a previous date/time stamp exists. If a previous date/time stamp exists, then canvasser program 130 preferably marks mode field 20 of the record as "U" for update. If no previous date/time stamp exists, then the document is a new one, and canvasser program 130 preferably marks mode field 20 as "N", for new. If no current date/time stamp exists, but a previous one existed, then obviously the document no longer exists and canvasser program 130 preferably marks mode field 20 as "D", for deleted. Canvasser program 130 then enters the record with mode field 20 and directory-filename field 28 into the working change table 162, as illustrated in block 306, and moves to block 307. In block 307, canvasser program 130 determines if there are other hyperlinked document 116 on web page 114, and if there are, then canvasser program goes to block 304 and gets the date/time stamp for the hyperlinked document 116. If there are no more hyperlinked document 116 in web page 114, then canvasser program 130 goes back to a preceding web page 114, which could be a menu or a submenu, as illustrated in block 308.

If there are no more menus or submenus, then canvasser program 130 exits or terminates, as illustrated in block 309. If there are more menus or submenus, then canvasser program 130 is instructed to go back to block 303 and trace each menu or submenu page down to leaf page to locate/identify hyperlinked documents 116. When the entire Internet web system has been traversed, canvasser program 130 archives the previous change table 162, and the current working change table 162 becomes the active "current" change table 162. While the above canvasser program 130 is described in relation to comparing date/time stamps, canvasser program 130 can compare found hyperlinked document 116 to current hyperlinked document 116 for changes in one of many ways known to those of ordinary skill in the art, as previously described.

Figure 4:
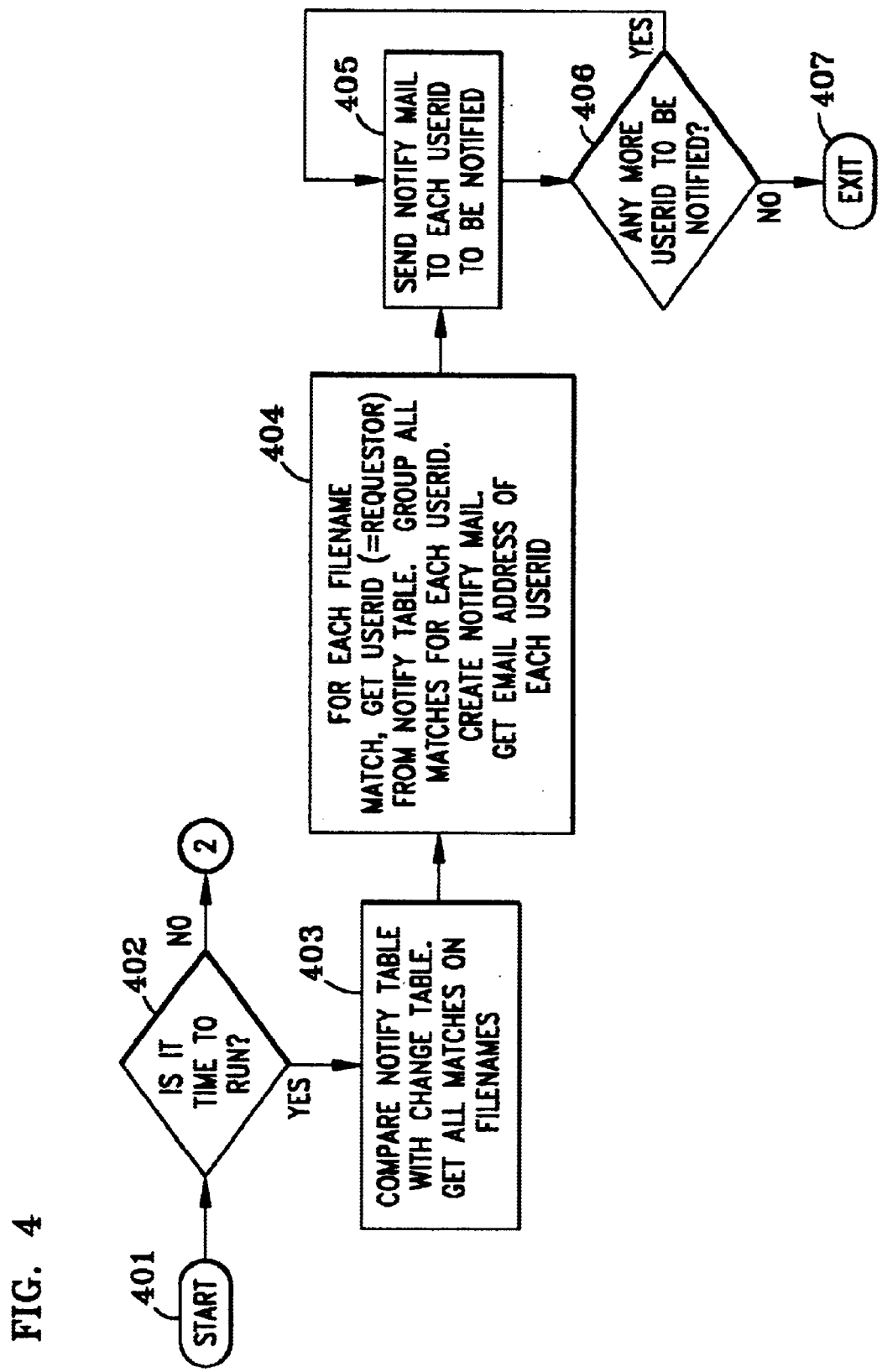
FIG. 4 is a flow chart illustration of a notify program, according to one preferred embodiment of this invention.

FIG. 4 is a flow chart illustration of notify program 140, according to one preferred embodiment of this invention. As seen in FIG. 4, notify program 140 is initiated in block 401. Preferably, notify program 140 is set up on a web server and runs as a batch run. Notify program 140 runs after the canvasser program 130 has completed running. The purpose of notify program 140 is to compare the filenames listed in change table 162 with the filenames listed in the notify table 160. Change table 162 is the result of periodic canvassing of all hyperlinked documents 116 by canvasser program 130 and recording all the hyperlinked documents 116 that had changed since last canvassed. In one preferred embodiment, notify program 140 is triggered by the system clock, and is set up in the CRONTAB to run at a specific time of the day, as illustrated in block 401. Notify program 140 gets triggered to run in block 402 at a specific time of the day. In one preferred embodiment, if the time of the day matches the preset time in the CRONTAB, then notify program 140 proceeds to block 303, if not, notify program 140 exits or terminates.

Notify program compares directory-filename field 28 for records within notify table 160 with directory-filename field 28 for records within change table 162, as illustrated in block 403. A "match" between two fields indicates that a certain hyperlinked document 116 that has been subscribed-to for notification by a user as registered in the notify table 160, has a matching filename in the change table 162. All matches are selected out and assembled in one place and sorted by notify-id, as illustrated in block 404. Each notify-id segment is split out and the e-mail address of each notify-id is then obtained and a notify-memo is composed. Notify program then composes the matched filename for each hyperlinked document 116 with their URL, and marks the matched filename for each hyperlinked document 116 as being new, deleted, or updated and changed. In one preferred embodiment, the memo tells the user that this e-mail notice 132 was sent to notify the user of the changes, as illustrated in FIG. 15.

The notify-memo is then sent to the e-mail address of the notify-id for the user that is on notification for a certain hyperlinked document 116, as illustrated in block 405. Upon sending the notify-memo, notify program 140 checks whether there are more e-mail notices 132 to send, as illustrated in block 406. If there are more e-mail notices 132 to send, then notify program 140 goes back to block 405 and composes more e-mail notices 132 to send. If there are no more e-mail notices 132 to send, notify program 140 exits or terminates, as illustrated in block 407. While the above notify program 140 is described in relation to sending e-mail notices 132 to notify users, notify program 140 can notify users in one of many ways known to those of ordinary skill in the art, such as facsimile, telephone, mail, or any other means for notifying a user.

Figure 5:
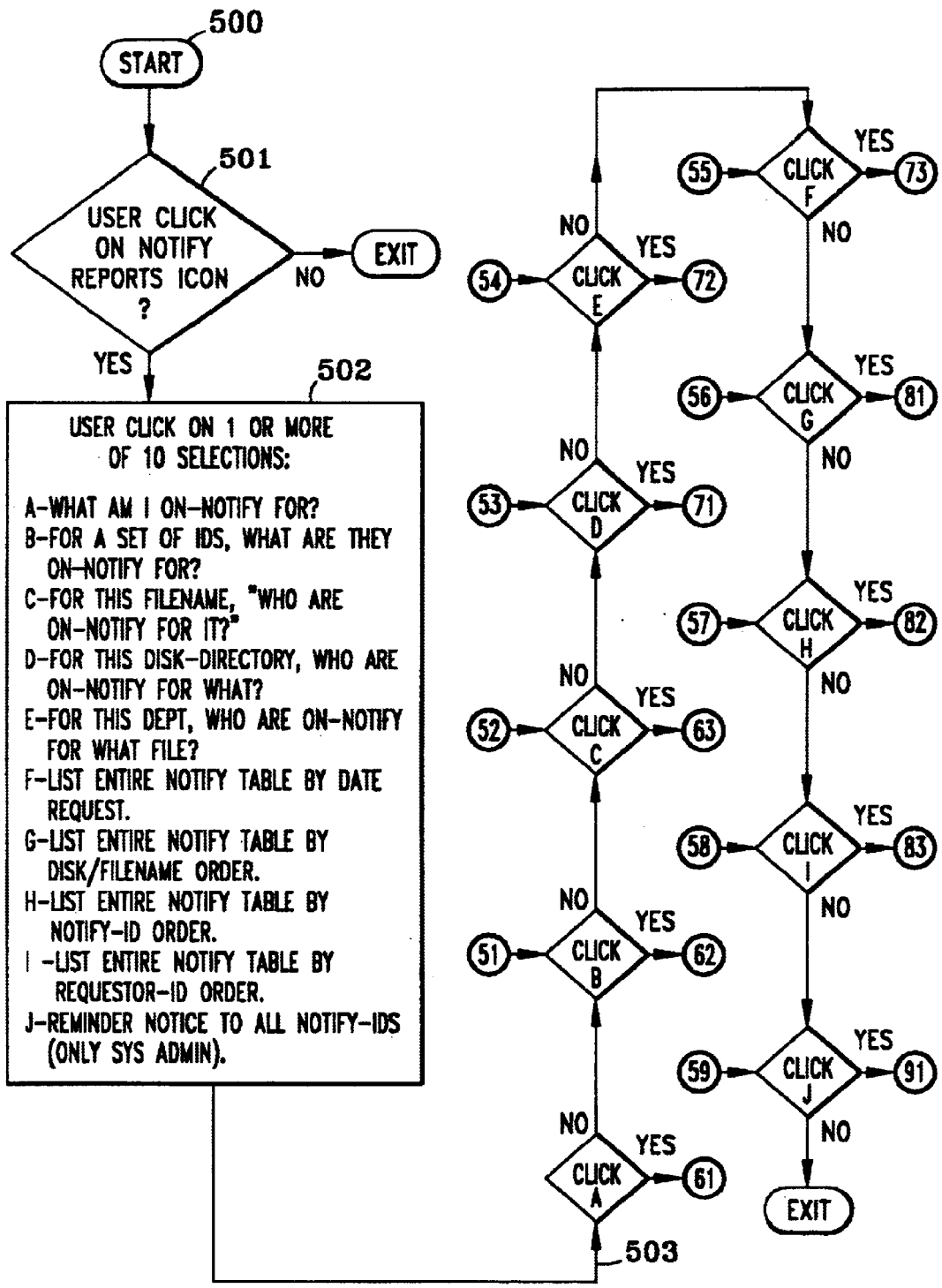
FIG. 5 is a flow chart illustration of a notify reports program, according to one preferred embodiment of this invention.
Figure 12:
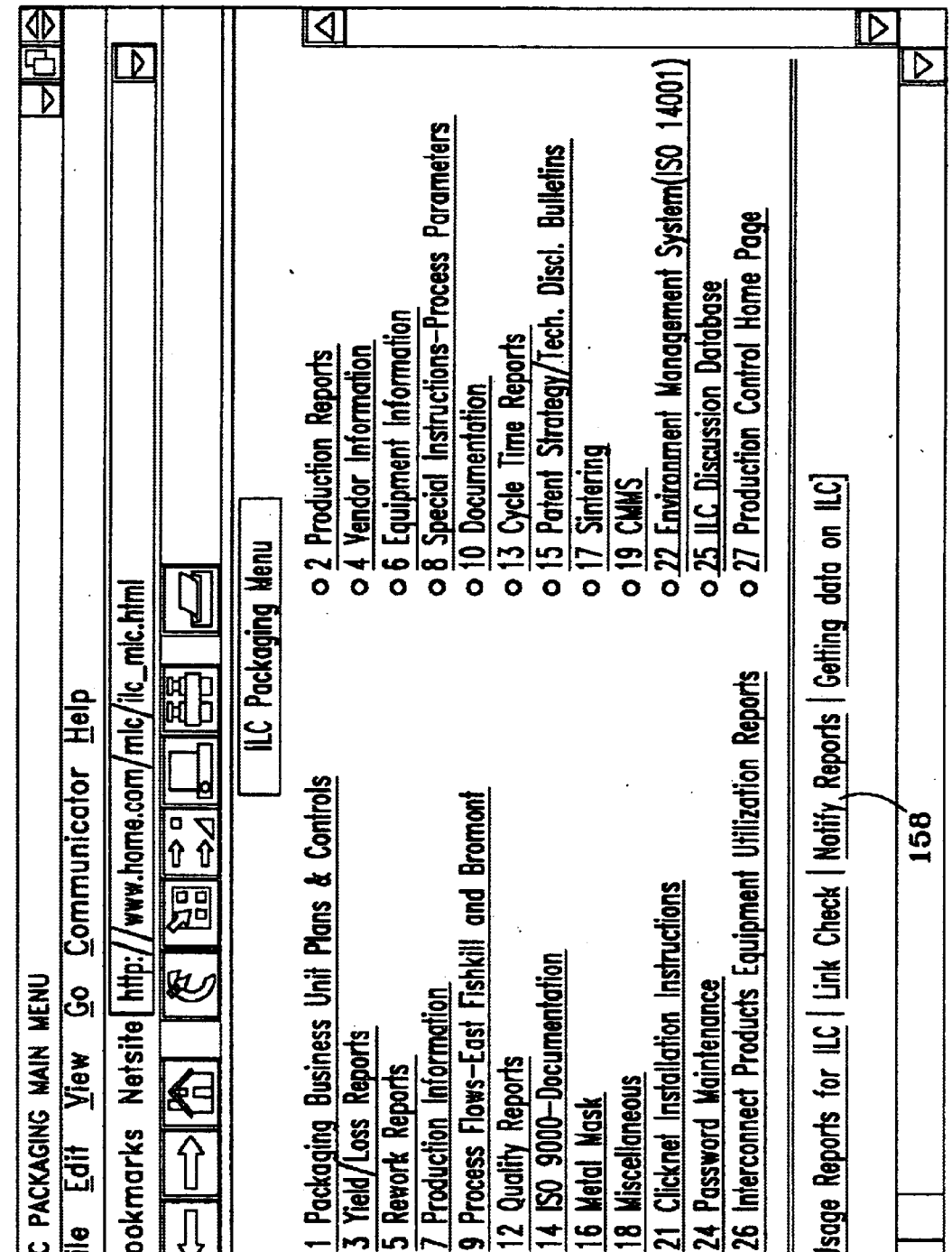
FIG. 12 is an illustration of a home page on the user's web browser, according to one preferred embodiment of this invention.

FIG. 5 is a flow chart illustration of notify reports program 150, according to one preferred embodiment of this invention. As seen in FIG. 5, notify reports program 150 is initiated in block 500. Preferably, notify reports program 150 exists as a CGI program. Notify reports program 150 is invoked when the user clicks on the notify report icon 158 in the home page of the user's web browser, as illustrated in FIG. 12. Notify reports program 150 then checks whether indeed the user has clicked on notify report icon 158, in block 501. If the user has not clicked on the notify report icon 158, notify reports program 150 exits or terminates. If the user has clicked on the notify report icon 158, notify reports program 150 then proceeds to block 502. In block 502, notify reports program 150 return the user a list of report selections 159 which the user can select to return one or more reports. In one preferred embodiment, notify reports program 150 returns the user a list of ten report selections 159, which the user can now further click on checkboxes 124 to choose one or more of the reports, as illustrated in block 502. The user needs to click on submit button 126 to send the requests to the server, as illustrated in FIG. 16. When the server receives the submitted request, it invokes notify reports program 150. Notify reports program 150 parses the input, sorts and selects records from notify table 160, formats the results, and sends the results to the user's email address, as illustrated in block 503. Preferably, the ten report selections 159 comprise the following: A—What am I on-notify for?; B—For a set of Ids, what are they on-notify for?; C—For this filename, "Who are on-notify for it?"; D—For this disk-directory, who are on-notify for what?; E—For this department, who are on-notify for what file?; F—List entire notify table by date request; G—List entire notify table by disk/filename order; H—List entire notify table by notify-id order; I—List entire notify table by user-id order; and J—Reminder notice to all notify-ids (Only System Admin), as illustrated in block 502.

Figure 6:
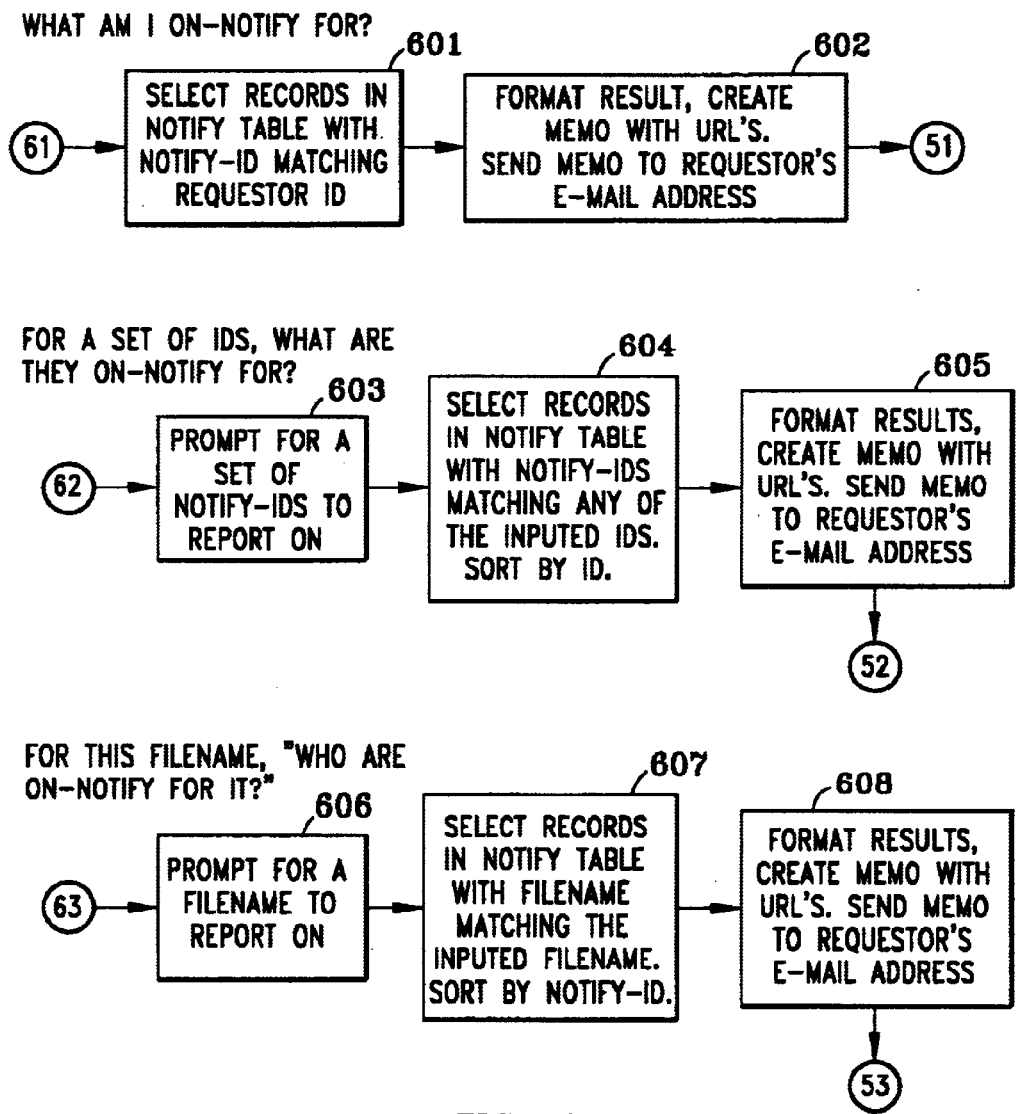
FIG. 6 is a flow chart illustration of report programs A, B, and C for a notify reports program, according to one preferred embodiment of this invention.

FIG. 6 is a flow chart illustration of report programs A, B, and C for notify reports program 150, each of which are executed when a report selections 159 is made, according to one preferred embodiment of this invention. Each report program reads, sorts, selects, and formats the contents of the notify table 160. The report program then sends the formatted output to the e-mail address of the user. When the user clicks on report selection A, that is the selection for "What am I on-notify for?", report program A selects records from notify table 160 wherein the notify-ids match the user's id, as illustrated in block 601. Report program A then generates a memo listing the matching filenames as URLs, and sending the memo to the user's e-mail address, as illustrated in block 602. An example of the results for report program A is illustrated in FIG. 17. In FIG. 17, notify table 160 was first sorted and records pertaining to the user's user-id are selected out, formatted, and presented back to the user.

When the user clicks on report selection B, that is the selection for "For a set of Ids, what are they on-notify for?", report program B next prompts the user for input for a set of notify-ids that the user is interested in, as illustrated in block 603. Report program B then matches the inputted set of notify-ids with the notify-ids in notify table 160, as illustrated in block 604. All matching notify-ids are selected out of notify table 160 and sorted by notify-id. A memo is then generated by report program B listing all the selected filenames as URLs, sorted first by notify-id and within the notify-id, sorted by filenames, as illustrated in block 605. The memo is then sent by program B to the user's e-mail address.

When the user clicks on report selection C, that is the selection for "For this filename, who are on-notify for it?", report program C next prompts the user for the specific filename the user is interested in, as illustrated in block 606. Report program C then matches the inputted filename with the filenames in notify table 160, as illustrated in block 607. All matching filenames are selected out of notify table 160 and sorted by notify-id. A memo is then generated listing all the selected records, sorted by notify-ids, as illustrated in block 608. This memo is then sent by program C to the user's e-mail address.

Figure 7:
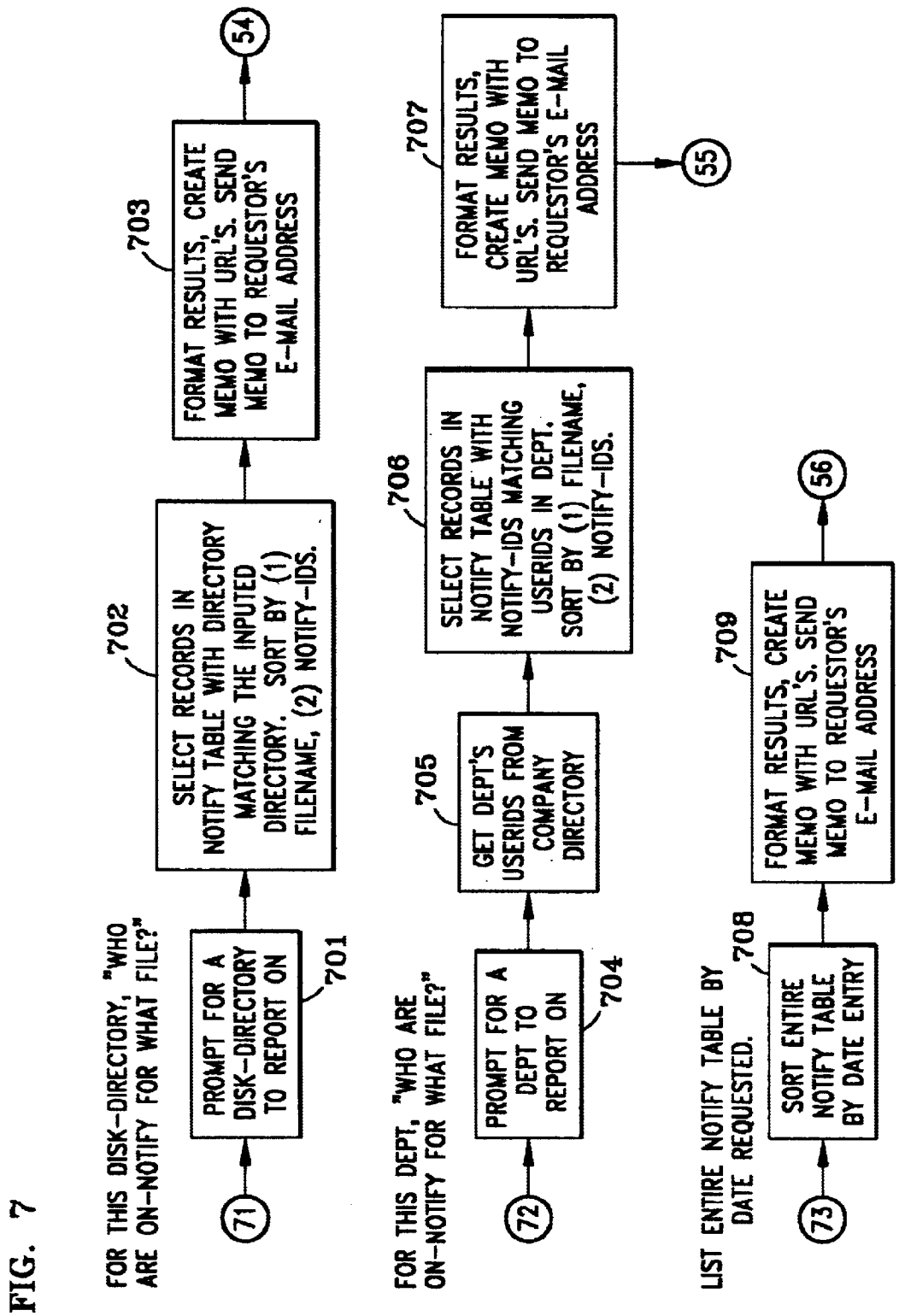
FIG. 7 is a flow chart illustration of report programs D, E, and F for a notify reports program, according to one preferred embodiment of this invention.

FIG. 7 is a flow chart illustration of report programs D, E, and F for notify reports program 150, each of which are executed when a report selections 159 is made, according to one preferred embodiment of this invention. Each report program reads, sorts, selects, and formats the contents of the notify table 160. The report program then sends the formatted output to the e-mail address of the user. When the user clicks on report selection D, that is the selection for "For this disk-directory, who are on-notify for what file?", report program D next prompts the user for the disk-directory the user is interested in, as illustrated in block 701. Report program D then matches the inputted disk-directory with the disk-directories in notify table 160, as illustrated in block 702. All matching disk-directories are selected out of notify table, and sorted first by filename, then within filename by notify-ids. A memo is then generated listing all the selected records, as illustrated in block 703. The filenames are listed in their URL form. This memo is then sent by program D to the user's e-mail address.

When the user clicks on report selection E, that is the selection for "For this department, who are on-notify for what file?", report program E next prompts the user for the department id the user is interested in, as illustrated in block 704. Report program E next get all the employees in the inputted department id from the company's directory, specifically the employees' serial numbers, as illustrated in block 705. Next, report program E matches the serial number with the user-ids in general notification system 100.

Report program E then matches all the user-ids in the department with all the notify-ids in notify table 160, as illustrated in block 706. All matching notify-ids with their corresponding filenames are selected out of notify table 160, and sorted first by filename, then within filename by notify-ids. A memo is then generated listing all the selected records, as illustrated in block 707. The filenames are listed in their URL form. This memo is then sent by report program E to the user's e-mail address.

When the user clicks on report selection F, that is the selection for "List entire notify table by date requested.", report program F goes and gets the entire notify table 160, and sorts notify table 160 by date entry order, as illustrated in block 708. A memo is then generated by report program F listing the entire notify table 160, as sorted by date entry order, as illustrated in block 709. The filenames are listed in their URL form, and the memo is then sent by report program F to the user's e-mail address.

FIG. 8 is a flow chart illustration of the report programs G, H and I for notify reports program 150, each of which are executed when a report selections 159 is made, according to one preferred embodiment of this invention. Each report program reads, sorts, selects, and formats the contents of the notify table 160. The report program then sends the formatted output to the e-mail address of the user. When the user clicks on report selection G, that is the selection for "List entire notify table by disk-directory.", report program G goes and gets the entire notify table 160, and sorts notify table 160 by disk-directory, as illustrated in block 801. A memo is then generated by report program G listing the entire notify table 160, as sorted by disk-directory, as illustrated in block 802. The filenames are listed in their URL form and the memo is then sent by report program G to the user's e-mail address.

When the user clicks on report selection H, that is the selection for "List entire notify table by notify-id.", report program H goes and gets the entire notify table 160, and sorts notify table 160 by notify-id, as illustrated in block 803. A memo is then generated by report program H listing the entire notify table 160, as sorted by notify-id, as illustrated in block 804. The filenames are listed in their URL form and the memo is then sent by report program H to the user's e-mail address. An example of the results for report program H is illustrated in FIG. 18. In FIG. 18, notify table 160 is sorted by the notify-id field 24 and the entire sorted notify table 160 is e-mailed to the user.

When the user clicks on report selection I, that is the selection for "List entire notify table by user-id.", report program I goes and gets the entire notify table 160, and sorts notify table 160 by user-id, as illustrated in block 805. A memo is then generated by report program I listing the entire notify table 160, as sorted by user-id, as illustrated in block 806. The filenames are listed in their URL form and a memo is then sent by report program I to the user's e-mail address.

Figure 9:
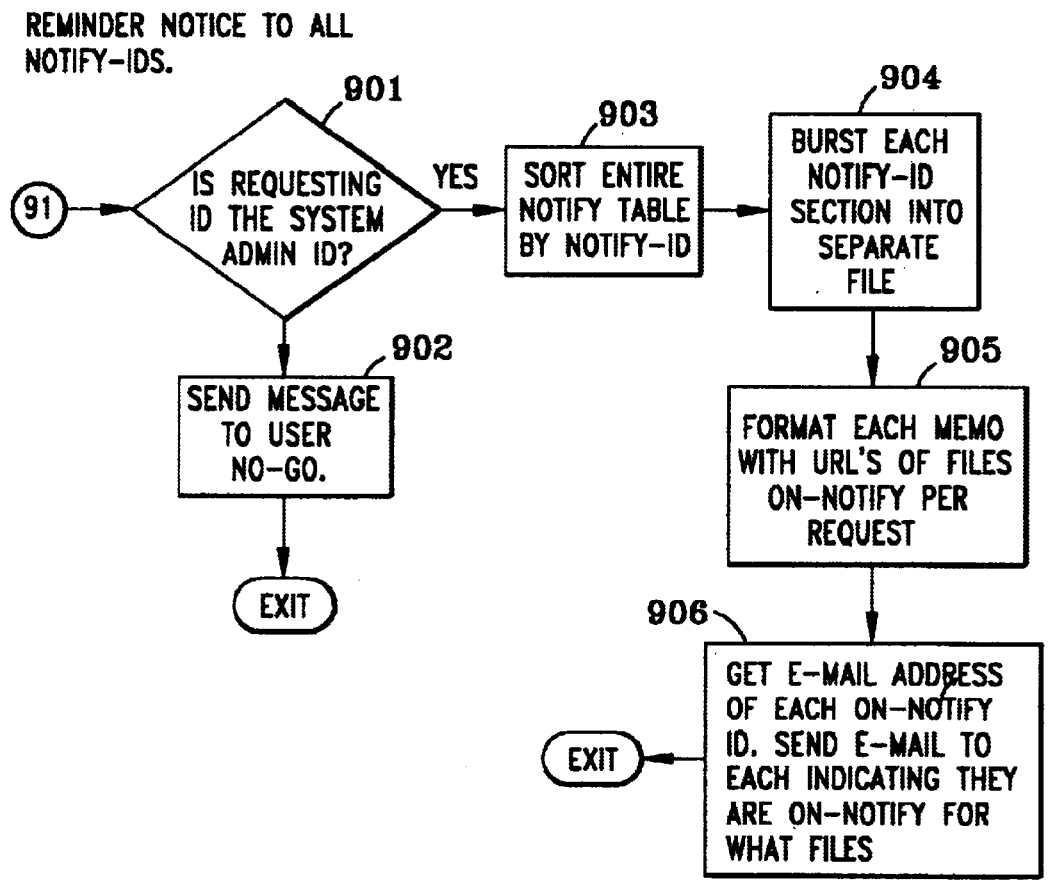
FIG. 9 is a flow chart illustration of report program J for a notify reports program, according to one preferred embodiment of this invention.

FIG. 9 is a flow chart illustration of report program J for notify reports program 150, which is executed when a report selections 159 is made, according to one preferred embodiment of this invention. Report program J reads, sorts, selects, and formats the contents of the notify table 160. Report program J then sends the formatted output to the e-mail address of the user. The purpose of report program J is to send reminder notice to all notify-ids in notify table 160, informing each user that they are "on-notify" for certain hyperlinked documents 116. Preferably, only the system administrator can execute report program J.

Report program J first determines whether the user-id is the id of the system administrator, as illustrated in block 901. If the user-id is the id of the system administrator, then report program J proceeds to block 903, if not, report program J prepares to exit the routine, and proceeds to block 902. At block 902, report program J sends a message to the user stating 'that only the system administrator is allowed to execute this selection. At block 903, report program J sorts the entire notify table 160 by notify-id. Then, report program J bursts the entire sorted notify table 160 into separate files by notify-id chunks or segments, as illustrated in block 904. For each file, report program J generates a memo listing the filenames in URL format for the hyperlinked documents 116 the user is on notification for, as illustrated in block 905. The memo reminds the user that the user is on notification for the following hyperlinked documents 116. For each memo, report program J gets the e-mail address of the notify-id, and sends the memo to that address, as illustrated in block 906.

FIG. 10 is an example of a notify table 160, according to one preferred embodiment of this invention. Notify table 160 is where each request for notification is recorded, as entered via subscription program 120. Preferably, notify table 160 comprises mode field 20, user-id field 22, notify-id field 24, entry-date field 26, and directory-filename field 28. Mode field 20 contains the nature of the notification. For example, in one preferred embodiment, in mode field 20, "U" stands for updates, which includes any changes in the date/time stamp of hyperlinked document 116, "D" stands for deleted, which occurs if no current date/time stamp exists, but a previous one existed, "N" stands for new, which occurs if no previous date/time stamp exists for hyperlinked document 116. User-id field 22 contains the id of the user who entered the request for notification. The user usually is also a user on notification for a particular hyperlinked document 116, but not always. For instance, a team leader could put everyone in his team, including himself/herself, on notification for a particular hyperlinked document 116.

Notify-id field 24 contains the id of a user on notification for a particular hyperlinked document 116. For example, if a user enters a notification subscription for two files, having five notify-ids, there will in fact be ten records created in notify table 160: five records for the five user-ids for the first file, and five other records for the five user-ids for the second file. Entry-date field 26 contains the date and time the notification subscription was entered. In one preferred embodiment, entry-date field 26 contains a 14-digit number format. For example, if entry-date field 26 contains the number 20000226090502, entry-date field 26 actually reads Feb. 26, 2000 at 09 am, 05 minutes and 02 seconds. A number format for entry-date field 26 is preferred since a number format can be sorted in ascending or descending order. Directory-filename field 28 contains the path to the place where the file resides along with the filename.

FIG. 11 is an example of a change table 162, according to one preferred embodiment of this invention. Change table 162 is where the change or update status of a hyperlinked document 116 is recorded, as canvassed by canvasser program 130. Preferably, change table 130 comprises mode field 20 and directory-filename field 28.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A system for notifying users of changes in a hyperlinked documents, the system comprising:

a computer;

a server operatively coupled with the computer;

a web browser that executes in the computer, the web browser accessing web pages stored on the server;

a general notification system integrally connected with the web browser, the general notification system configured to provide a notification icon on a web page, wherein notification of any changes to the hyperlinked documents can be requested by selecting the notification icon; and wherein the general notification system comprises a subscription program which is invoked upon selecting a notification icon, the web page having a plurality of hypertext links associated with a plurality of hyperlinked documents, the subscription program converting the web page to a notification page, and the notification page having a checkbox next to each of the hypertext links.

2. The system of claim 1, wherein the subscription program prompts the user if the user is invoking the subscription program for notification or unnotification.

3. The system of claim 1, wherein the user requests notification for chances to the hyperlinked documents by selecting the checkbox for each hypertext link for which change notification is desired.

4. The system of claim 1, further comprising a notify table configured to record all the requests for notification from the user.

5. The system of claim 4, wherein the notify table contains one or more data fields selected from the group consisting of a mode field, a user-id field, a notify-id field, an entry-date field and directory-filename field.

6. The system of claim 1, further comprising a canvasser program configured to find selected hyperlinked documents and compare a found hyperlinked document to a current hyperlinked document for changes to the hyperlinked document.

7. The system of claim 6, further comprising a change table for recording all the changes to the selected hyperlinked documents.

8. The system of claim 6, further comprising a notify program, the notify program comparing data fields in the notify table with data fields in the change table and notifying the user of any changes to the selected hyperlinked documents.

9. The system of claim 1, further comprising a notify reports program, the notify reports program is configured to generate a report for the user.

10. The system of claim 9, wherein the notify reports program allows the user to select from a plurality of report selections.

11. A method of notifying a user of changes in a hyperlinked document, the method comprising;

providing a notification icon within a web page having a plurality of hypertext links associated with a plurality of hyperlinked documents;

selecting the notification icon;

converting the web page to a notification page upon selecting the notification icon, the notification page having a checkbox next to each hypertext link;

marking the checkbox to select each hypertext link for which change notification is desired; and notifying the user of any changes to the selected hyperlinked documents associated with the selected hypertext links.

12. A method according to claim 11 further comprising;

periodically canvassing the Internet for the selected hyperlinked documents; and comparing a found hyperlinked document to a current hyperlinked document for changes.

13. A method according to claim 12, wherein the comparing of the found hyperlinked document to the current hyperlinked document comprises comparing the date/time stamp of the found hyperlinked document to the date/time stamp of the current hyperlinked document.

14. A method according to claim 11 further comprising sending an e-mail notice to the user in order to notify the user of changes to the hyperlinked document.

15. A method according to claim 11 further comprising authenticating the user-id of the user requesting notification.

16. A method according to claim 11 further comprising the user listing the user-id of additional users who desire notification.

17. A computer program for notifying a user of changes in a hyperlinked document, the computer program comprising:

a storage medium;

notification icon code on the storage medium for generating a notification icon within a web page having a plurality of hypertext links associated with a plurality of hyperlinked documents;

subscription program code on the storage medium for converting the web page to a notification page upon selection of the notification icon, the notification page having a checkbox next to every hypertext link on the notification page and whereby marking a checkbox will select a hypertext link for which change notification is desired;

notify program code on the storage medium for notifying the user of any changes to the selected hyperlinked documents.

18. The computer program according to claim 17 further comprising canvasser program code configured to find the selected hyperlinked documents and compare a found hyperlinked document to a current hyperlinked document for changes.

19. A computer program according to claim 18, wherein the canvasser program code compares the date/time stamp of the found hyperlinked document to the date/time stamp of the current hyperlinked document.

20. A computer program according to claim 18, wherein the canvasser program code periodically finds the selected hyperlinked documents.

21. A computer program according to claim 17 further comprising notify reports program code for generating a report for the user.

22. A computer program according to claim 17, wherein the notify program code notifies the user of any changes to the selected hyperlinked documents by sending the user an e-mail.

* * * * *